(12) United States Patent
Kadota

(10) Patent No.: US 8,255,481 B2
(45) Date of Patent: Aug. 28, 2012

(54) INFORMATION DELIVERY DEVICE AND INFORMATION PROCESSING METHOD

(75) Inventor: Masatoshi Kadota, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 704 days.

(21) Appl. No.: 12/027,520

(22) Filed: Feb. 7, 2008

(65) Prior Publication Data

US 2008/0215666 A1 Sep. 4, 2008

(30) Foreign Application Priority Data

Feb. 7, 2007 (JP) .................................. 2007-028114

(51) Int. Cl.
G06F 15/16 (2006.01)
(52) U.S. Cl. ....................................... 709/217; 709/224
(58) Field of Classification Search .................. 709/217, 709/224
See application file for complete search history.

(56) References Cited

U.S. PATENT DOCUMENTS

| | | | | |
|---|---|---|---|---|
| 6,112,246 | A * | 8/2000 | Horbal et al. .................. | 709/230 |
| 6,314,476 | B1 | 11/2001 | Ohara | |
| 6,832,239 | B1 * | 12/2004 | Kraft et al. ..................... | 709/203 |
| 7,120,450 | B2 * | 10/2006 | Hines et al. ................ | 455/456.1 |
| 7,131,122 | B1 * | 10/2006 | Lakhdhir ....................... | 717/168 |
| 7,146,412 | B2 * | 12/2006 | Turnbull ......................... | 709/220 |
| 7,426,380 | B2 * | 9/2008 | Hines et al. ................ | 455/404.2 |
| 7,698,404 | B2 | 4/2010 | Sugimoto | |
| 7,711,956 | B2 * | 5/2010 | Kinoshita et al. ............. | 713/168 |
| 2005/0021728 | A1 | 1/2005 | Sugimoto | |
| 2006/0044587 | A1 | 3/2006 | Yoshida | |
| 2006/0282833 | A1 * | 12/2006 | Choe .............................. | 717/171 |
| 2007/0028120 | A1 * | 2/2007 | Wysocki et al. ............... | 713/192 |
| 2008/0040681 | A1 * | 2/2008 | Synstelien et al. ............. | 715/765 |
| 2010/0268772 | A1 * | 10/2010 | Romanek et al. ............. | 709/203 |

FOREIGN PATENT DOCUMENTS

| | | |
|---|---|---|
| JP | 11-073282 A | 3/1999 |
| JP | 11-252119 A | 9/1999 |
| JP | 2000-293324 | 10/2000 |
| JP | 2001-075754 A | 3/2001 |

(Continued)

OTHER PUBLICATIONS

JP Notification of Reasons for Rejection dates Feb. 7, 2012, corresponding Application No. 2008-026824; English Translation.

(Continued)

Primary Examiner — Kevin Bates
(74) Attorney, Agent, or Firm — Banner & Witcoff, Ltd.

(57) ABSTRACT

There is provided an information delivery device including a command transmission unit configured to accept a command request from a client and to transmit a command corresponding to the command request to a device, an information obtaining unit configured to obtain device information transmitted from the device as a response to the command, and an information storage unit configured to store the device information obtained by the information obtaining unit. The device may further include a judgment unit configured to judge which of current device information obtained by the information obtaining unit and past device information stored in the information storage unit should be provided for a requesting source, the current device information corresponding to device information presently set to the device, and an information providing unit configured to provide one of the current device information and the past device information for the requesting source in accordance with a judgment result of the judgment unit.

11 Claims, 5 Drawing Sheets

FOREIGN PATENT DOCUMENTS

| | | |
|---|---|---|
| JP | 2004-213211 | 7/2004 |
| JP | 2005-041127 A | 2/2005 |
| JP | 2005-173799 A | 6/2005 |
| JP | 2006-067328 A | 3/2006 |
| JP | 2006-146492 A | 6/2006 |

OTHER PUBLICATIONS

JP Office Action dtd Sep. 27, 2011, JP Appln. 2008-026824, English translation.

* cited by examiner

INFORMATION DELIVERY DEVICE AND INFORMATION PROCESSING METHOD

CROSS-REFERENCE TO RELATED APPLICATION

This application claims priority under 35 U.S.C. §119 from Japanese Patent Application No. 2007-028114, filed on Feb. 7, 2007. The entire subject matter of the application is incorporated herein by reference.

BACKGROUND

1. Technical Field

Aspects of the present invention relate to an information delivery device which obtains device information from a device, such as a printer, connected thereto.

2. Related Art

In general, an information delivery device has a function of obtaining device information from a device connected to the information delivery device. The device information obtained from the device is processed in various ways on the information delivery device. Japanese Patent Provisional Publication No. 2000-293324A discloses an information delivery device having the above mentioned function.

Although the information delivery device disclosed in the publication is able to obtain device information from a device, there is a case where a considerable length of time period is required to obtain the device information after the information delivery device transmits a request for device information to the device. That is because there is a case where the device does not return a response immediately.

If the response is not obtained immediately from the device, a requesting source, which is, for example, a process of an application running on the information delivery device and has requested the device information, may cause a timeout error and moves to an error process. In this case, the requesting source process is not able to execute information processing even if the device information can be obtained afterward.

SUMMARY

Aspects of the present invention are advantageous in that an information delivery device capable of providing device information for a requesting source even if a device does not return immediately a response to the information delivery device is provided.

According to an aspect of the invention, there is provided an information delivery device which comprises: a command transmission unit configured to accept a command request from a client and to transmit a command corresponding to the command request to a device; an information obtaining unit configured to obtain device information transmitted from the device as a response to the command transmitted by the command transmission unit; an information storage unit configured to store the device information obtained by the information obtaining unit; a judgment unit configured to judge which of current device information obtained by the information obtaining unit and past device information stored in the information storage unit should be provided for a requesting source, the current device information corresponding to device information presently set to the device; and an information providing unit configured to provide one of the current device information and the past device information for the requesting source in accordance with a judgment result of the judgment unit.

Such a configuration enables the information delivery device to provide the past device information for the requesting source even if the information providing device is in a state where acquisition of the device information is difficult. As a result, it is possible to quickly provide the device information for the requesting source.

According to another aspect of the invention, there is provided an information processing method, comprising the steps of: accepting a command request from a client to transmit a command corresponding to the command request to a device; obtaining device information transmitted from the device as a response to the command; storing the obtained device information; judging which of current device information obtained by the obtaining step and past device information stored by the storing step should be provided for a requesting source, the current device information corresponding to device information presently set to the device; and providing one of the current device information and the past device information for the requesting source in accordance with a judgment result of the judgment step.

Such a configuration enables the information delivery device to provide the past device information for the requesting source even if the information providing device is in a state where acquisition of the device information is difficult. As a result, it is possible to quickly provide the device information for the requesting source.

According to another aspect of the invention, there is provided a computer readable medium having computer readable instruction stored thereon, which, when executed by a processor of an information delivery device, configures the processor to perform the steps of: accepting a command request from a client to transmit a command corresponding to the command request to a device; obtaining device information transmitted from the device as a response to the command; storing the obtained device information; judging which of current device information obtained by the obtaining step and past device information stored by the storing step should be provided for a requesting source, the current device information corresponding to device information presently set to the device; and providing one of the current device information and the past device information for the requesting source in accordance with a judgment result of the judgment step.

Such a configuration enables the information delivery device to provide the past device information for the requesting source even if the information providing device is in a state where acquisition of the device information is difficult. As a result, it is possible to quickly provide the device information for the requesting source.

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

BRIEF DESCRIPTION OF THE ACCOMPANYING DRAWINGS

DETAILED DESCRIPTION

Hereafter, an embodiment according to the invention will be described with reference to the accompanying drawings.

Figure 1:
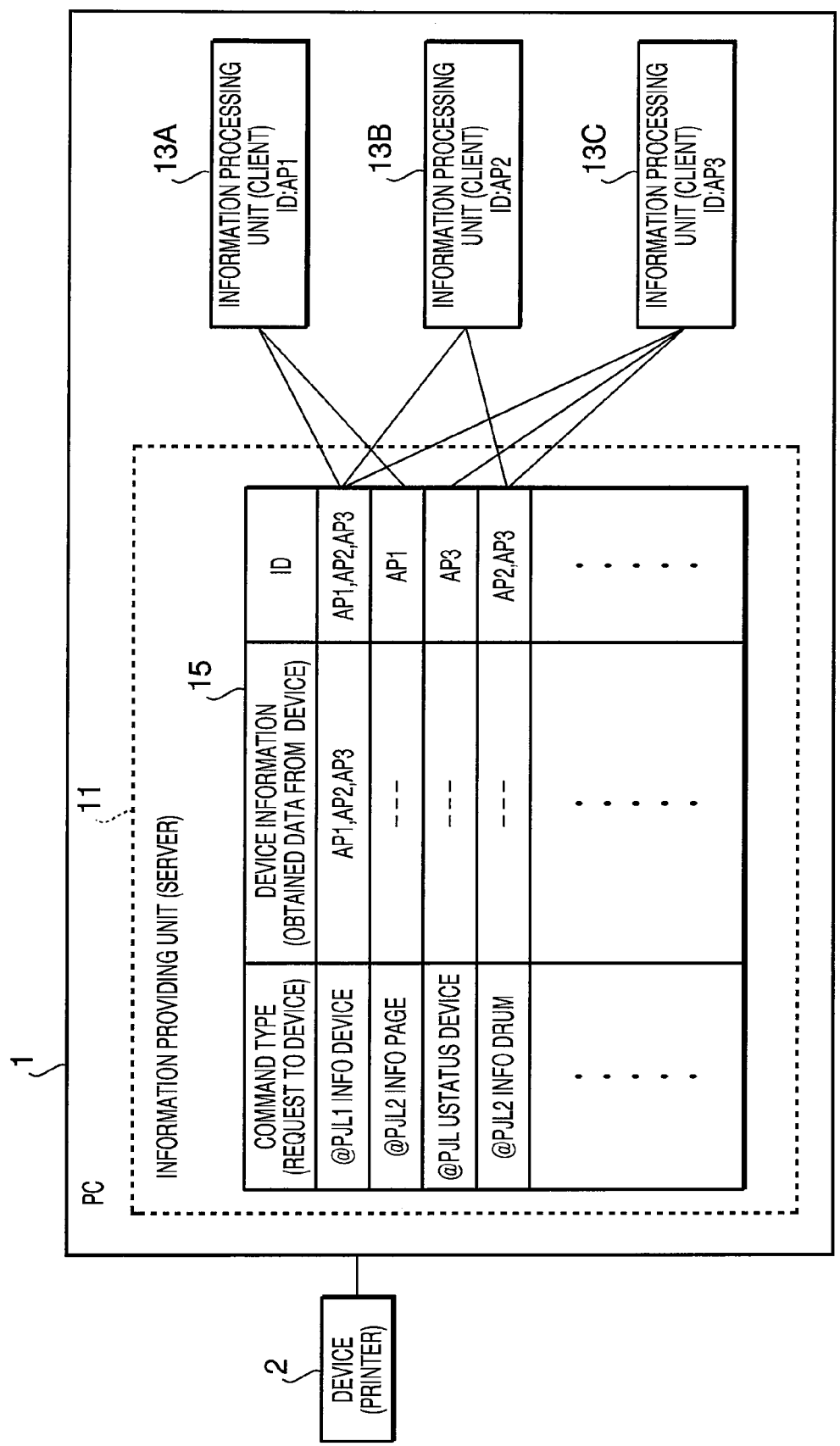
FIG. 1 illustrates a general configuration of a system including an information delivery device according to an embodiment and a device.

FIG. 1 illustrates a general configuration of a system including a PC (Personal Computer) 1 and a device 2 (e.g., a printer). On the PC 1, a multitask OS (Operating System) having a multitask function is implemented. Under control of the multitask function of the multitask OS, a CPU of the PC 1 concurrently executes a plurality of processes of one or more programs. In the PC 1, a cache 15 is prepared to provide device information. In FIG. 1, an example of contents of the cache 15 which is explained later is also illustrated.

As described below, under control of the multitask function, various functional units, such as an information providing unit 11 and information processing units 13A to 13C, run on the PC 1. Further, a device controller program which serves to communicate with the device 2 and a print spooler which manages print data as a print job run on the PC 1. The device controller program and the print spooler may be provided for the PC 1 as standard functions of the multitask OS.

By way of example, it is assumed that Windows® which has the above mentioned basic functions of a multitask OS is installed in the PC 1.

The information providing unit 11 which is implemented by one of programs running on the PC 1 functions as a server for providing information. Each of the information processing units which are parts of programs running on the PC 1 functions as a client for requesting device information. The information providing unit 11 obtains device information from the device 2 in response to a request from one of the information processing units 13A to 13C. After obtaining the device information, the information providing unit 11 provides the device information in response to a request for one of the information processing units 13A to 13C.

Each of the information processing units 13A to 13C is a process for executing information processing in accordance with the device information provided by the server (i.e., the information providing unit 11). An example of information processing is a process as a status monitor for displaying a current status of the device in real time on a display of the PC 1 or a process for displaying a serial number or a version of firmware of the device 2 on the display of the PC 1.

Since the information processing units 13A to 13C are individual applications, the information processing units 13A to 13C do not communicate with each other. On the other hand, if the information providing unit 11 is not provided in the PC 1, a possibility that one of the information processing units (e.g., the information processing unit 13A) acquires data to be provided for another information processing unit (e.g., the information processing unit 13B or 13C) arises. That is, there may be a case where data which is to be provided for a particular information processing unit of the information processing units 13A-13C is not properly acquired by the particular information processing unit. It should be noted that the information providing unit 11 is able to solve such a problem by handling properly requests from the information processing units 13A-13C. That is, the information providing unit 11 serves to appropriately provide data obtained from the device 2 to a proper one of the information processing units 13A-13C.

It should be noted that although in FIG. 1 only three information processing units 13A-13C are illustrated by way of example, the number of information processing units running concurrently on the PC 1 is not limited to such an example. Each information processing unit is allowed to start or terminates a process at any given time.

The device 2 has a function of providing device information concerning the device 2 for the PC 1 in response to a request from the PC 1. The device information includes, for example, "information concerning a status of a device", such as an online state or a offline state, "information concerning frequency of use", such as the number of printed sheets for each paper size and the total number of printed sheets. Further, the device information may include "information concerning conditions of replaceable components", such as a replacement time, "information concerning conditions of consumable components", such as a remaining amount of toner or ink and the number of remaining sheets, and "information concerning the number of occurrences of errors", such as a number of occurrences of paper jam.

The PC 1 is allowed to request any of the above mentioned pieces of information by transmitting a command to the device 2. More specifically, the PC 1 requests the device information by transmitting, for example, a PJL (Printer Job Language) command to the device 2. The PJL is a command language which is developed by Hewlett-Packard and is widely used in recent years. In general, the PJL command is used to control various functions that a printer (or a device having a printing function) has.

In order to transmit a PJL command to the device 2, the PC 1 executes a process which is similar to a process for transmitting print data to the device 2. More specifically, when one of the information processing units 13A to 13C transmits a transmission request command to the information providing unit 11, the information providing unit 11 transmits a PJL command to the device 2 in response to receipt of the transmission request command.

The PJL command output by the information providing unit 11 is passed to the print spooler via the printer driver, and the print spooler processes the received PJL command as a print job. Then, the PJL command is transmitted to the device 2.

The device 2 is able to receive the PJL command as in the case where the device receives print data. The device 2 is able to judge the received data to be a PJL command in accordance with header information of the received data, and to analyze the received data. If the device 2 judges the received data to be a PJL command to which the device 2 is able to respond, the device 2 reads the device information corresponding to the received PJL command from an internal memory thereof and transmits the device information to the PC 1.

On the PC 1, the information providing unit 11 receives the device information returned by the device 2. It is understood that the way that the PC 1 obtains the device information from the device 2 depends on a communication interface between the PC 1 and the device 2. In this embodiment, the PC 1 and the device 2 are connected by a USB interface.

The information providing unit 11 operates to receive information to obtain the device information. If the amount of received information is zero, the information providing unit 11 repeats trying to receive information from the device 2.

If information is received, the information providing unit 11 checks whether the received information is the requested device information. If the received information is not the requested device information, the information providing unit 11 executes the receiving process again. By this configuration, the requested information can be finally obtained by the information providing unit 11.

After obtaining the device information, the information providing unit 11 stores the device information in the cache 15 which is allocated in an internal memory of the PC 1 when the information providing unit 11 is activated. In the cache 15, a plurality of memory regions respectively corresponding to a plurality of types of PJL commands are allocated. Each memory region stores the device information (which is returned as a response to a corresponding PJL command), and an identification of a client (i.e., one of information processing units 13A to 13C) which requests to transmit the PJL command.

Hereafter, usage of the cache 15 is explained with reference to FIG. 1. If the information processing unit 13A requests the information providing unit 11 to transmit a PJL command "@PJL1 INFO DEVICE", the information providing unit 11 transmits this command to the device 2. When the device information is received from the device 2 as a response to the command "@PJL1 INFO DEVICE", the device information and a client ID (corresponding to the information processing unit 13A) are stored in the memory region corresponding to the PJL command "@PJL1 INFO DEVICE" in the cache 15.

For example, if the device information "BUSY" is received from the device 2, the device information "BUSY" is stored in the memory region corresponding to the PJL command "@PJL1 INFO DEVICE" in the cache 15 (see FIG. 1). In this case, if the client ID of the client (i.e., the information providing unit 13A) is "AP1", the client ID "AP1" is also stored in the memory region corresponding to the PJL command "@PJL1 INFO DEVICE" in the cache 15 (see FIG. 1).

There is a case where the information processing unit 13B subsequently requests the information providing unit 11 to transmit the same PJL command "@PJL1 INFO DEVICE" to the device 2. In this case, when the information providing unit 11 receives the device information from the device 2 as a response to the PJL command "@PJL1 INFO DEVICE", the received device information and the client ID of the information processing unit 13B are stored in the cache as 15 in the case of the above mentioned operation example. For example, if the client ID of the client (i.e., the information processing unit 13B) is "AP2", the client ID "AP2" is additionally stored in the memory region corresponding to the "@PJL1 INFO DEVICE" (see FIG. 1).

If the information processing unit 13A requests the information providing unit 11 to transmit a PJL command "@PJL2 INFO PAGE" to the device 2, the information providing unit 11 transmits the command to the device 2. When the device information is received from the device 2 as a response to the PJL command "@PJL2 INFO PAGE", the received device information and the client ID of the client (i.e., the information processing unit 13A) are stored in an a memory region corresponding to the PJL command "@PJL2 INFO PAGE" in the cache 15.

It should be noted that a plurality of pieces of information obtained for different types of PJL commands are respectively stored in separate memory regions in the cache 15 even if the different types of PJL commands are requested by the same client.

Thus, the device information is stored in the cache 15 for each of the different types of commands together with the corresponding client ID. As a result, a plurality of groups of information, each of which includes the device information and at least one device ID, are registered in the cache 15 as shown in FIG. 1.

If the information providing unit 11 receives a read command from a client afterward, the information providing unit 11 searches the cache 15 using the ID corresponding a requesting client as a keyword. For example, the requesting client is the information processing unit 13A, the information providing unit 11 searches the cache 15 using an ID "AP1" as a keyword.

In this case, two memory regions corresponding to the "@PJL1 INFO DEVICE" and "@PJL2 INFO PAGE" are detected. Then, two pieces of device information is read from the detected two memory regions, and the two pieces of device information are provided for the information providing unit 13A.

Although, in the example of the contents of the cache 15, command types are included, the contents of the cache 15 may be prepared not to include such command types. For example, by defining in advance memory addresses of memory regions in accordance with the command types, it becomes possible to obtain desired device information and the client ID from the cache 15 in accordance with a target command type. Therefore, in this case it is not necessary to store command types in the cache 15.

Figure 2:
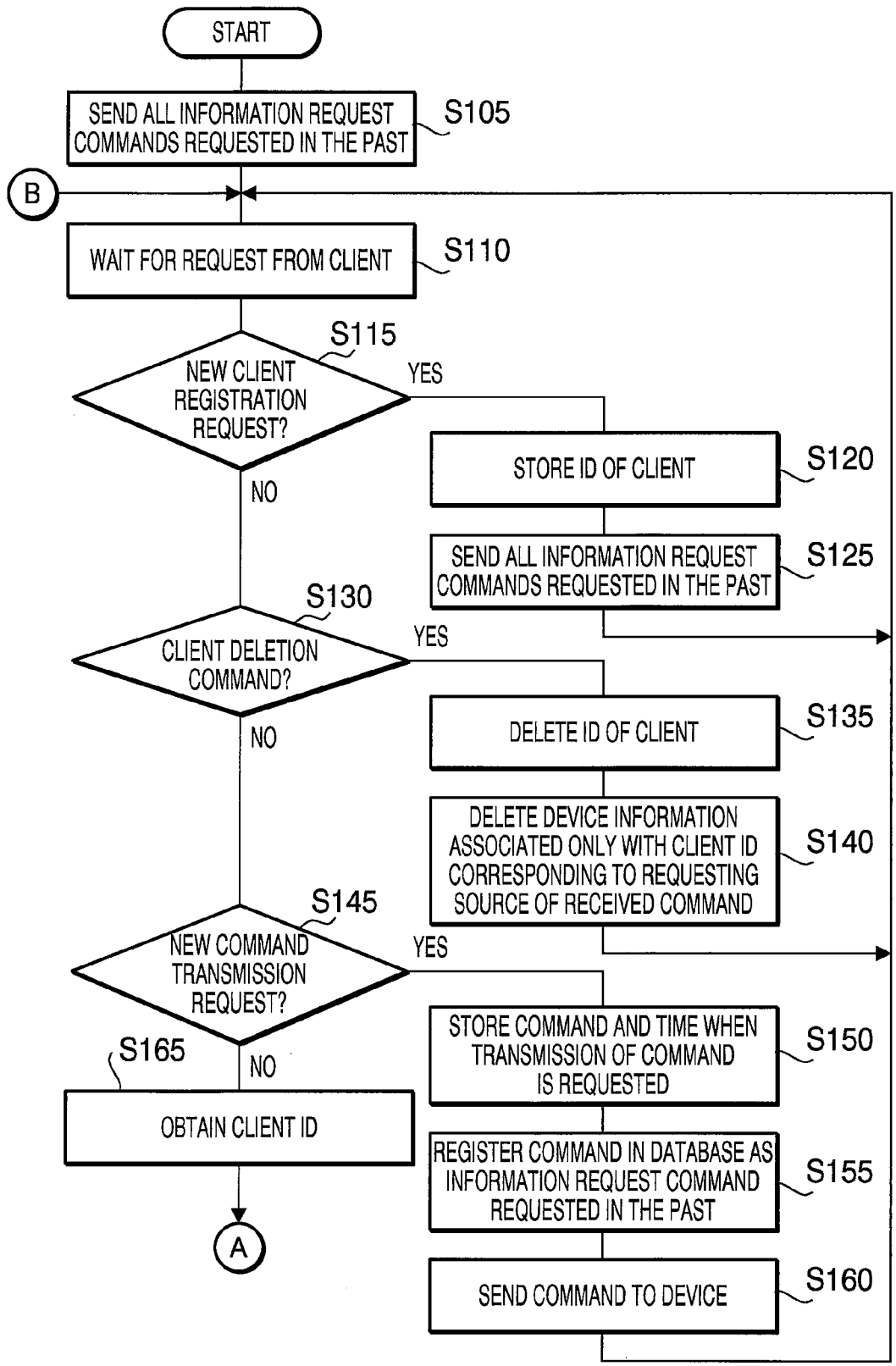
FIGS. 2 and 3 illustrate a main process for executing functions of the information delivery device.

Hereafter, a main process for executing the above mentioned functions of the information providing unit 11 is explained with reference to FIGS. 2 and 3. The main process may be started at a time when execution of the information providing unit 11 is required. For example, the main process is started at the time when the PC 1 turned to on.

First, the information providing unit 11 transmits all of information request commands which the information providing unit 11 was requested to transmit in the past, to the device 2 connected to the PC 2. The expression "information request commands which the information providing unit 11 was requested to transmit in the past" represents all of types of commands which the information providing unit 11 received in the past from the clients, excepting commands (e.g., a setting command) not accompanied by a request for information. The commands which the information providing unit 11 received in the past from the clients have been registered by step S155 (which is described later) in a database (i.e., a file) provided in the PC 1.

Therefore, in step S105, the information providing unit 11 reads all of the commands registered in the database, and then transmits all the read commands to the device 2. If a plurality of devices 2 can be used from the PC 1, all the read commands may be transmitted to each of the plurality of devices 2.

Next, the information providing unit 11 moves to a state of waiting for a request from one of the information processing units 13A to 13C (step S110). If a request is received from one of the information processing units 13A to 13C, control proceeds from step S110 to step S115 where the information providing unit 11 judges whether the received request is a request for additionally registering a new client (hereafter, referred to as a new client registration request).

If the received request is the new client registration request (S115: YES), the information providing unit 11 registers a client ID of a requesting source of the received command (step S120). Since unique IDs (AP1-AP3) are respectively assigned to the information processing units 13A to 13C, one of the unique IDs is registered in the cache 15.

Next, the information providing unit 11 transmits all of information request commands which the information providing unit 11 was requested to transmit in the past, to the device 2 connected to the PC 2 as in the case of step S105 (step S125). If a plurality of devices 2 are connected to the PC 1, all of the information request commands may be transmitted to each of the plurality of devices 2. By the step S125, the device information stored in the cache 15 can be updated to the latest device information. After step S125 is processed, control returns to step S110.

If it is judged in step S115 that the received request is not the new client registration command (S115: NO), the information providing unit 11 judges whether the received command is a client deletion command (step S130).

If the received command is the client deletion command (S130: YES), the information providing unit 11 deletes a client ID corresponding to the requesting source of the received command from the cache 15 (step S135). Then, the information providing unit 11 deletes the device information associated only with the client ID corresponding to the requesting source of the received command, from the cache 15 (step S140). After step S140 is processed, control returns to step S110.

If it is judged in step S130 that the received command is not the client deletion command (S130: NO), the information providing unit 11 judges whether the received command is a new command transmission request (step S145). In this embodiment, a command transmission request containing a PJL command possibly is transmitted from each of the information processing units 13A to 13C.

If the received command is a new command transmission request (S145: YES), the information providing unit 11 stores a PJL command for which transmission to the device 2 is requested and a time (hereafter a transmission request time) at which the transmission of the PJL command is requested in the cache 15. It should be noted that the PJL command thus stored in the cache 15 is referred to in a judgment step S315 which is described later.

Next, the information providing unit 11 registers the requested PJL command in the database as an information request command which the information providing unit 11 was requested to transmit in the past (step S155). By thus registering the requested PJL command in the database, the information providing unit 11 is able to obtain, from the database, the information request commands which the information providing unit 11 was requested to transmit in the past in step S105 or S125.

Then, the information providing unit 11 transmits the requested PJL command to the device 2 via the spooler (step S160). After step S160 is processed, control returns to step S110.

If it is judged in step S145 that the received command is not a new command transmission request (S145: NO), the information providing unit 11 judges that the information providing unit 11 receives, from the client, a read request for reading the device information. It should be noted that the main process may include a step for judging whether the received request is a read request after step S145.

If the information providing unit 11 receives the read request, control proceeds to step S165 where the information providing unit 11 obtains the client ID corresponding to the requesting source of the received request. Then, the information providing unit 11 searches the cache 15 using the obtained ID as a keyword (step S205). If the memory region to which the obtained ID is related is not found in the cache 15 (i.e., no memory region is searched for) (S210: NO), the cache 15 does not have the device information corresponding to the requested command. Therefore, in this case control returns to step S110.

If at least one memory region to which the obtained ID is related is found in the cache 15 (S210: YES), the information providing unit 11 waits for a maximum of two seconds until the current device information (i.e., the device information presently set to the device 2) is received (step S215). In step S215, if the current device information is received and the cache 15 is rewritten (step S335) before two seconds have elapsed, control exits from step S215. If two seconds have elapsed from the start of step S215, control also exits from step S215 even if the current device information is not obtained. As described later, the current device information is obtained from the device 2 and is stored in the cache 15 by a cache management thread which is a resident thread.

After step S215 is processed, the information providing unit 11 judges whether the current device information is obtained (step S220). Since the current device information is stored in the cache 15 by the cache management thread, in step S220 the information providing unit 11 judges whether the current device information is stored in the cache 15.

If the current device information is obtained (S220: YES), the information providing unit 11 transmits the device information of the at least one memory region to which the obtained ID is related, to the client corresponding to the requesting source (step S225). If the current device information is not obtained (S220: NO), the information providing unit 11 judges whether past device information is stored in the cache 15 (step S230).

If the past device information is stored in the cache 15 (S230: YES), the past device information of the at least one memory region to which the obtained ID is related is transmitted to the client corresponding to the requesting source (step S235). In this embodiment, when the device information stored in the cache 15 is transmitted to the client in step S235, the information providing unit 11 modifies the device information to be transmitted to indicate the device information is the past information.

For example, if the current device information is obtained in step S220 (i.e., at the time immediately after obtaining the current device information), text information including the PJL command which was transmitted to the device 2 and the returned value from the device is transmitted to the client in step S225.

For example, if the obtained device information is the device information corresponding to the command "@PJL1 INFO DEVICE", text information "@PJL1 INFO DEVICE+ (returned value from the device)" is transmitted to the client.

On the other hand, if the past device information is transmitted to the client in step S235, the second keyword of the text information including the PJL command which was transmitted to the device 2 and the returned value from the device is modified.

For example, if the device information is "@PJL2 INFO DEVICE+(returned value from the device)", the second keyword "INFO" is added a letter "C" to indicate that the device information is obtained from the cache 15 (i.e., to indicate that the device information is past information). In this case, the modified device information "@PJL2 CINFO DEVICE+ (returned value from the device)" is transmitted to the client.

Consequently, the client receives the device information "@PJL2 CINFO DEVICE+(returned value from the device)" from the information providing unit 11. By checking the second keyword "CINFO" of the received device information, the client is able to recognize that the received device information is the past device information stored in the cache 15. If it is judged in step S230 that the past device information is not found in the cache 15 (S230: NO), control proceeds to step S240 without processing step S235.

After step S225 or S235 is processed, control also proceeds to step S240. In step S240, the information providing unit 11 judges whether a current mode is a mode where the cache 15 is maintained after processing all the requests. The information providing unit 11 is configured to allow a user to select in advance one of the "mode where the cache is maintained after processing all the requests" and a "mode where the cache is deleted after processing all the requests". The information providing unit 11 operates in accordance with one of the selected modes.

The fact that the "mode where the cache is maintained after processing all the requests" is not selected means that, if all of the transmission requests from all the clients have been processed, the device information in the cache 15 is not used anymore. Therefore, if the "mode where the cache is maintained after processing all the requests" is not selected (S240: NO), the device information is deleted from the cache 15 if all of the requests have been processed (step S245). Then, control returns to step S110.

That is, in step S245, if a target PJL response is a response to a request from a single client (e.g., the information processing unit 13A), data in the cache 15 is deleted after the PJL response is provided for the single client. On the other hand, in step S245, if a target PJL response is a response to a request from a plurality of clients (e.g., the information processing units 13A and 13B), data in the cache 15 is deleted after the PJL response is provided for all of the plurality of clients (e.g., the information processing units 13A and 13B).

The fact that the "mode where the cache is maintained after processing all the requests" is selected means that if a transmission request is received from a client after completion of transmission of the device information, the device information in the cache 15 is used. Therefore, if the "mode where the cache is maintained after processing all the requests" is selected (S240: YES), control returns to step S110 without processing S245.

Figure 4:
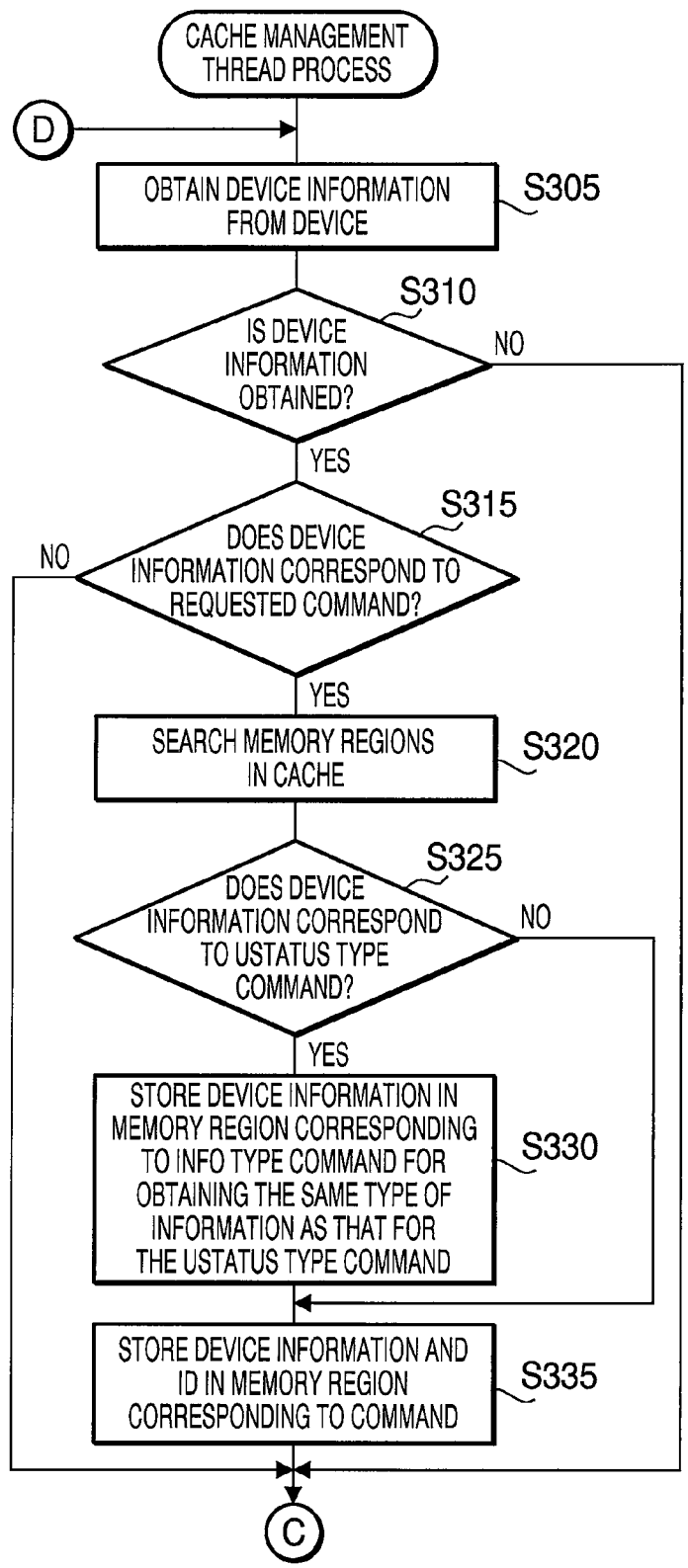
FIGS. 4 and 5 illustrate a cache management thread process which is a resident thread on the information delivery device.
Figure 5:
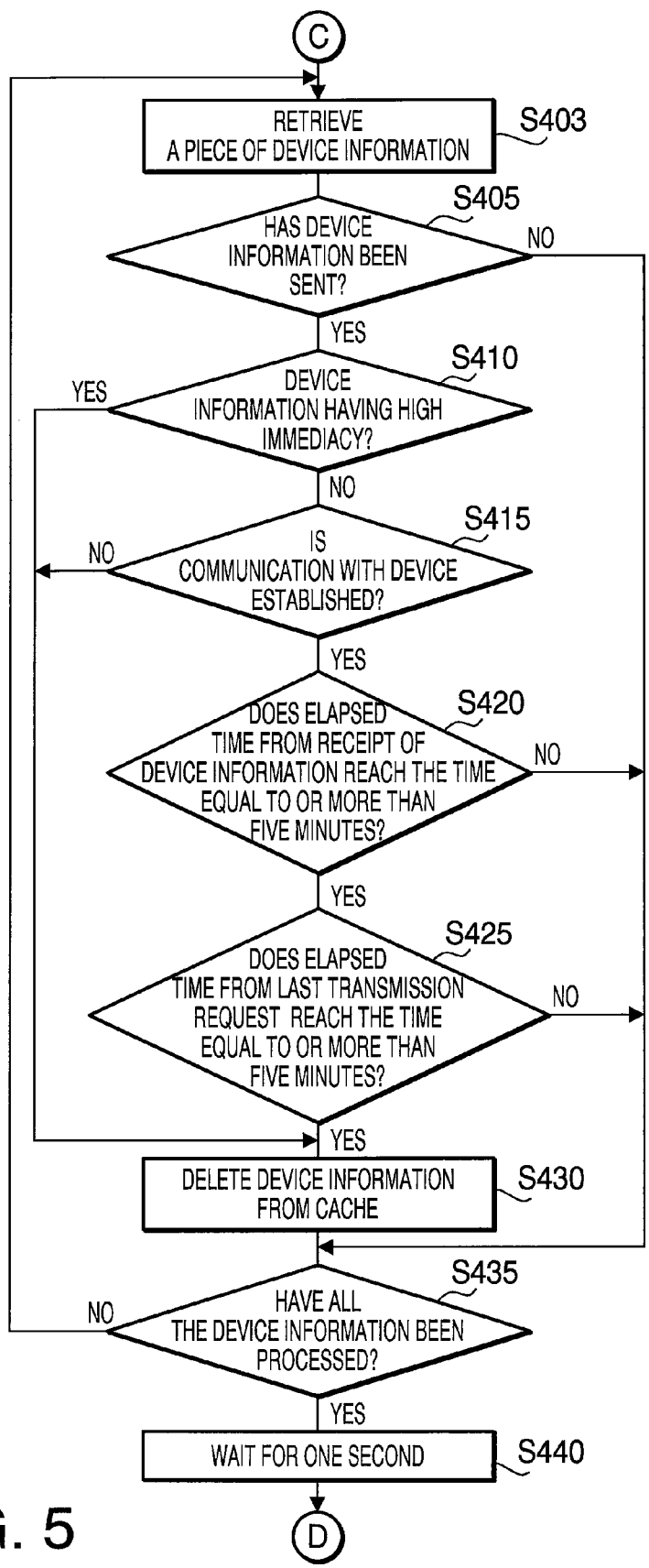

Hereafter, the cache management thread process which is a resident thread is explained with reference to FIGS. 4 and 5. The cache management thread processes executed by the information providing unit 11 concurrently with the main process.

When the cache management thread process is started, the information providing unit 11 obtains the device information from the device 2 (step S305). Then, the information providing unit 11 judges whether the device information is obtained (step S310). For example, if the information providing unit 11 has not transmitted the PJL command to the device 2 yet, the device 2 is not able to transmit the device information. Therefore, in such a case, it is judged that the device information is not obtained (S310: NO). Then, control proceeds to step S405 (see FIG. 5).

If the device information is obtained (S310: YES), control proceeds to step S315 where the information providing unit 11 judges whether the information obtained in step S305 is the device information obtained as a response to the command requested by the client. As described above, the command requested by the client is stored in the cache 15. Therefore, the information providing unit 11 is able to judge whether the device information obtained in step S305 is the requested device information by comparing the command stored in the cache 15 with the device information obtained in step S305.

If it is judged in step S315 that the obtained device information corresponds to the command requested by the client (S315: YES), the information providing unit 11 searches the memory regions in the cache 15 (step S320). Then, the information providing unit 11 judges whether the obtained device information corresponds to a USTATUS type command (step S325). The "USTATUS type command" means a PJL command whose second keyword is "USTATUS". In the example shown in FIG. 1, the command "@PJL USTATUS DEVICE" corresponds to the USTATUS type command.

Therefore, in step S325, the information providing unit 11 analyzes the PJL command corresponding to the obtained device information to detect a character string contained on the PJL command and to judge whether the detected character string contains the second keyword "USTATUS". If the obtained device information corresponds to the USTATUS type command (S325: YES), the information providing unit 11 stores the obtained device information in the memory region corresponding to an INFO type command which is a command for obtaining the same type of information as that for the USTATUS type command (step S330).

The INFO type command is a PJL command whose second keyword is "INFO". In the example shown in FIG. 1, the command "@PJL1 INFO DEVICE", "@PJL INFO PAGE" and "@PJL INFO DRUM" correspond to the INFO type command.

The information providing unit 11 is able to judge whether the PJL command is the INFO type command for obtaining the same type of information as that of the USTATUS type command by judging whether the third keywords in the USTATUS type command and the INFO type command match with each other. That is, if the third keywords in the USTATUS type command and the INFO type command match with each other, the information providing unit 11 judges that this INFO type command is a PJL command for obtaining the same type of information as that for the USTATUS type command. If the third keywords in the USTATUS type command and the INFO type command do not match with each other, the information providing unit 11 judges that the INFO type command is not a PJL command for obtaining the same type of information as that for the USTATUS type command.

In the example shown in FIG. 1, the command "@PJL1 INFO DEVICE" corresponds to the INFO type command for obtaining the same type of information as that of the "@PJL USTATUS DEVICE". The commands "@PJL INFO PAGE" and "@PJL INFO DRUM" do not correspond to the INFO type command for obtaining the same type of information as that for the "@PJL USTATUS DEVICE".

If the USTATUS type command is transmitted to the device 2 once, new device information is provided from the device 2 each time a status change occurs in the device 2. On the other hand, if the INFO type command is transmitted to the device 2 once, device information is provided from the device 2 one time as a response to the command.

However, if the third keywords of the USTATUS type command the INFO type command match with each other, the types of the device information to be obtained from the device 2 as responses to the USTATUS type command and the INFO type command are equal to each other. Therefore, if the device information can be obtained in step S305 and the obtained device information corresponds to the USTATUS type command, step S330 is processed.

As a result, if the obtained device information corresponds to the USTATUS type command, the obtained device information is also stored in the memory region corresponding to the INFO type command for obtaining the same type of information as that for the USTATUS type command.

That is, regarding a command (i.e., the USTATUS type command) for enabling the information providing unit 11 to obtain the current device information for a plurality of times by transmitting the command to the device 2 one time and a command (i.e., the INFO type command) for obtaining the device information only one time by transmitting the command to the device 2 one time, the information providing unit 11 updates the memory regions corresponding the both types of these commands when the information providing unit 11 receives the device information after transmitting one of these commands. Therefore, by transmitting one of these commands, the memory region corresponding to the other command can also be updated without transmitting the other command to the device 2.

After thus processing step S325 or S330, the information providing unit 11 stores the device information obtained in step S305 and the client ID detected in step S320 in the memory region corresponding to the requested command while associating these pieces of information with each other (step S335). If it is judged in step S315 that the obtained device information does not correspond to the command requested by the client (S315: NO), control proceeds to step S405 without processing the steps S320 to S335.

After thus processing step S315 to S335, steps from S405 are executed to judge whether to delete the device information from the cache 15 based on some judgment conditions. In step S403, a piece of device information to be processed as target device information is retrieved from the cache 15. In step S405, the information providing unit 11 judges whether target device information has been transmitted to all the necessary clients. The information providing unit 11 judges that the target device information has been transmitted to all the necessary clients if the transmission step S225 or S235 has already processed. If the target device information has not been transmitted (S405: NO), control proceeds to step S435.

If the device information has been transmitted (S405: YES), control proceeds to step S410 where the information providing unit 11 judges whether the target device information is the device information having high immediacy (step S410). The term "device information having high immediacy" means the device information for which the user wants to obtain the current information. Therefore, regarding the device information having high immediacy, the degree of usefulness of such device information stored in the cache 15 is low.

The degree of immediacy of the device information may be determined in advance for each of the PJL command type, and may be stored in the database of the PC 1. The user is allowed to modify the database through a dedicated tool or an editor. Therefore, typically, the device information corresponding to the PJL command to which the high degree of immediacy is assigned as an initial value of the database is judged to be the device information having the high immediacy. If the judgment criterion (i.e., the degree of immediacy assigned to each PJL command) is modified partly or totally by the user, the degree of immediacy of the device information may be determined in accordance with the modified judgment criterion.

In step S410, the information providing unit 11 judges which of PJL commands the target device information 11 corresponds to. If the target device information is judged to be the device information having the high immediacy (S410: YES), control proceeds to step S430.

If the target device information is not the device information having the high immediacy (S410: NO), the information providing unit 11 judges whether communication with the device 2 can be established (step S415). The state where the communication with the device 2 can not be established is, for example, a state where the device 2 is in the state of power off or a state where a network cable is disconnected from the device 2.

If the communication with the device 2 is not established (S415: NO), control proceeds to step S430. If the communication with the device 2 is established (S415: YES), the information providing unit 11 judges whether the elapsed time from the receipt of the target device information reaches the time equal to or more than five minutes (step S420). If the elapsed time from the receipt of the target device information does not reach five minutes (S420: NO), control proceeds to step S435.

If the elapsed time from the receipt of the target device information has reached the time equal to or more than five minutes (S420: NO), the information providing unit 11 judges whether the elapsed time from the last transmission request reaches the time equal to or more than five minutes (step S425). If the elapsed from the last transmission request has reached the time equal to or more than five minutes (S425: YES), control proceeds to step S430. If the elapsed from the last transmission request have not reached the time equal to or more than five minutes (S425: NO), control proceeds to step S435.

If control proceeds to step S430 from one of the steps S410 to S425, the target device information is deleted from the cache 15 (step S430). That is, in this case, the device information in the cache 15 is prohibited from being provided for the clients.

After proceeding to step S435 from step S430 or from one of steps S410 to S425, the information providing unit 11 judges whether all of the pieces of device information have been processed (step S435).

Since a plurality of pieces of device information corresponding to the plurality of types of commands are stored in the cache 15, the information providing unit 11 judges whether these pieces of device information have been processed. If all of the pieces of device information have not been processed (S435: NO), control returns to step S403 to repeat the steps S403 to S430. By thus repeating steps S403 to S430, all of the pieces of device information in the cache 15 can be successively processed.

If all of the pieces of device information in the cache 15 have been processed (S435: YES), the information providing unit 11 waits for one second (step S440). Then, control returns to step S305.

By thus executing the cache management thread process, steps from the step S315 can be executed each time the device information can e obtained from the device 2 at the step S305. Consequently, the device information is stored in the cache 15 for each of the plurality of types of commands.

A part of the device information in the cache 15 or the entire device information in the cache 15 is deleted from the cache 15 in accordance with the judgment results of the steps S405 to S425.

Hereafter, advantages achieved by the above mentioned embodiment are described. According to the above mentioned embodiment, the current device information can be provided for the clients by the step S225. It is also possible to provide the past device information for the clients by the step S235.

Therefore, even if the information providing unit 11 is in the state where acquisition of the device information is difficult, the information providing unit 11 is able to provide the past device information for the clients (i.e., the information processing units 13A to 13C). As a result, it is possible to quickly provide the device information for the clients.

In the above mentioned embodiment, when the past device information is provided for the clients (the information processing units 13A to 13C), an identification indicating that the device information is the past information is added to the device information to be provided. Therefore, each of the clients is able to judge whether the obtained device information is the past information.

Regarding the device information which should not be provided for the client as the past information, providing of such device information for the clients can be prevented by steps S405 to S430. Therefore, the device information which should not be provided for the clients can be prevented from being provided for the clients as past information.

In the above mentioned embodiment, the step S105 is processed in response to initiation of the information providing unit 11 or the cache management thread process, and the device information obtained as the response to the command is stored in the cache 15 by step S305. Therefore, if the information providing unit 11 moves to the state of not being able to provide the device information to one of the clients at the time when the device information is required by one of the clients, the information providing unit 11 is able to provide the past device information in the cache 15.

In step S105, the device information which was obtained in the past is targeted for acquisition from the device 2. Therefore, it is possible to obtain and store the device information while narrowing the types of device information to be obtained to certain types of device information having the high possibility of being requested by the clients.

According to the embodiment, after the USATUS type command is transmitted to the device 2, the information providing unit 11 obtains and stores the device information each time the status of the device 2 changes by the cache management thread process.

Although the present invention has been described in considerable detail with reference to certain preferred embodiments thereof, other embodiments are possible.

In the above mentioned embodiment, the device 2 configured to provide the device information for the PC 1 is a printer. However, it is understood that various types of devices having the printing function, such as an MFP (Multifunction Peripheral) having the printing function or a facsimile device with the printing function, can be used as the device 2.

It is also possible to use various types of devices other than a device having the printing function as the device 2. If such a device not having the printing function is employed as the device 2, a certain type of command language other than the PJL command may be employed for the communication between the PC 1 and the device 2.

In the above mentioned embodiment, the information providing unit 11 provides the device information for one of the clients (the information processing units 13A to 13C) in response to a request from one of the clients. However, the information providing unit 11 may be configured to actively provide the device information for the clients without receiving a request.

Figure 3:
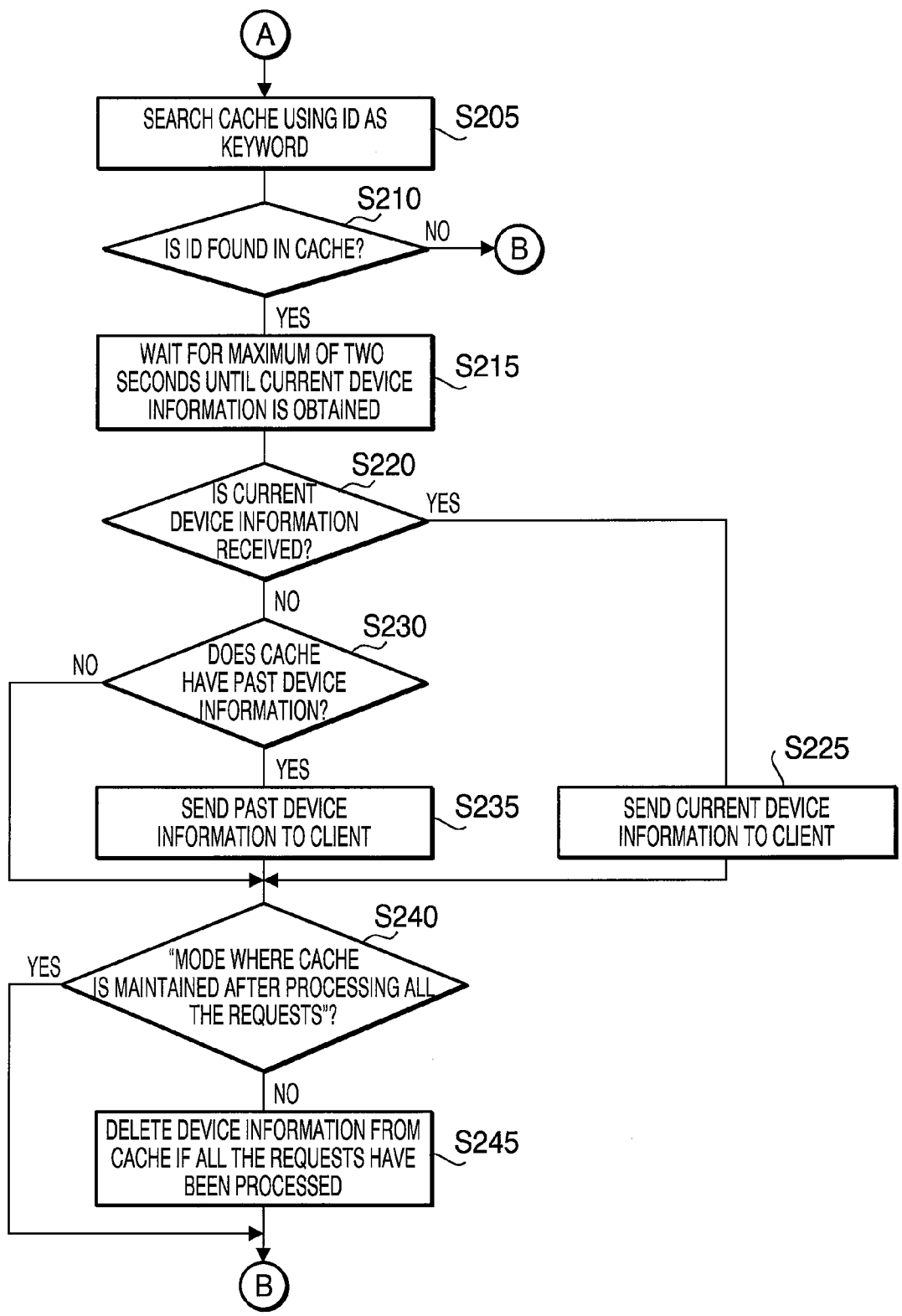

In the above mentioned main process shown in FIG. 3, the information providing unit 11 provides the device information stored in the cache 15 for the clients if a response from the device 2 can not be obtained for a predetermined time period (e.g. two seconds). However, the information providing unit 11 may be configured to provide the device information stored in the cache 15 for the clients if a response is obtained from the device 2 but the obtained response is invalid.

An information storage unit for storing the device information obtained from the device 2 may be configured to separately manage a main memory area for maintaining all the data obtained from the device 2 until all the data is transmitted to the clients and a cache memory area for maintaining data obtained from the device 2 for a certain time period. In this case, the PJL data received from the device 2 is copied to the main memory area without condition. On the other hand, regarding the cache memory area, data obtained from the device 2 is selectively stored while executing judgment steps similar to S240 and S410. That is, in this case only PJL data whose degree of immediacy is low is stored in the cache memory area. That is, in this case, the device information is selectively stored in the cache memory area through judgment steps for judging the immediacy of the device information, while the device information in the main memory area is deleted after completion of transmission of the device information to the clients.

In step S235 of FIG. 3, identification (i.e., a letter "C") is added to the device information to indicate the device information provided for a client is the past device information. However, step S235 may be configured not to add such identification (i.e., the letter "C") to the device information. Such a configuration enables a general-purpose client to operate in cooperation with the information providing unit 11. Alternatively, the operation of step S235 may be selectable between a mode where the identification (i.e., a letter "C") is added to the device information and a mode where the identification (i.e., a letter "C") is not added to the device information.

What is claimed is:

1. An information delivery device, comprising:
   a processor;
   an information storage unit configured to store device information;
   memory for storing computer-executable instructions, which when executed by the processor, cause the information delivery device to provide:
      a command transmission unit configured to receive a command request from a client and to transmit a command requesting a device to transmit device information in response to the command request;
      an information obtaining unit configured to obtain device information transmitted from the device in response to the command transmitted by the command transmission unit;
      a judgment unit configured to judge whether the device information has been obtained by the information obtaining unit from the device within a predetermined period in response to the command transmitted by the command transmission unit;
      an information providing unit configured to:
         provide the device information obtained by the information obtaining unit from the device to the client in response to the command request if the judgment unit judges that the device information has been obtained within the predetermined period, and
         provide past device information stored in the information storage unit to the client in response to the command request if the judgment unit judges that the device information has not been obtained within the predetermined time period;
      a prohibition unit configured to prohibit a predetermined type of device information from being provided to the client as past device information by the information providing unit, wherein the prohibition unit comprises
         a deletion unit configured to delete, from the information storage unit, the past device information corresponding to the predetermined type of device information, and configured to judge that the past device information is the predetermined type of device information to be deleted if an elapsed time from acquisition of the past device information reaches a first predetermined time period and an elapsed time from last reception of the command request from the client reaches a second predetermined time period.

2. The information delivery device according to claim 1, wherein the information providing unit is further configured to provide identification information for identifying the past device information as past information when the information providing unit provides the past device information to the client.

3. The information delivery device according to claim 1, wherein the predetermined type of device information is defined as information to be provided to the client as latest information.

4. The information delivery device according to claim 1, wherein the predetermined type of device information corresponds to the device information concerning the device for which communication cannot be established.

5. The information delivery device according to claim 1, wherein:
the information storage unit starts to store the device information in response to the information obtaining unit starting to obtain the device information.

6. The information delivery device according to claim 5, wherein the information obtaining unit is further configured to obtain at least a part of a plurality of types of device information which the information obtaining unit has received from the device in the past.

7. The information delivery device according to claim 1, wherein:
the information obtaining unit is further configured to obtain the device information from the device each time a status change occurs in the device; and
the information storage unit is further configured to store the device information each time the information obtaining unit obtains the device information from the device.

8. The information delivery device according to claim 1, wherein the information storage unit is configured to store the device information obtained from the device in association with the command transmitted to the device.

9. The information delivery device according to claim 1, wherein the information storage unit is configured such that, if the command transmitted by the command transmission unit corresponds to a predetermined command type for obtaining device information for a plurality of times by transmitting the command to the device one time, the information storage unit stores the obtained device information in association with the command of the predetermined command type and also stores the obtained device information in association with a command of a command type for obtaining same type of device information as that obtained with the command of the predetermined command type.

10. An information processing method, comprising the steps of:
receiving a command request from a client;
transmitting a command corresponding to the command request to a device;
obtaining device information transmitted from the device in response to the command;
storing the obtained device information;
judging whether the device information has been obtained in the obtaining step from the device within a predetermined period in response to the command transmitted in the transmitting step;
providing the device information obtained in the information obtaining step from the device to the client in response to the command request if the judging step judges that the device information has been obtained within the predetermined period;
providing stored past device information to the client in response to the command request if the judging step judges that the device information has not been obtained within the predetermined time period;
prohibiting a predetermined type of device information from being provided to the client as past device information;
deleting the past device information corresponding to the predetermined type of device information; and
judging that the past device information is the predetermined type of device information to be deleted if an elapsed time from acquisition of the past device information reaches a first predetermined time period and an elapsed time from last reception of the command request from the client reaches a second predetermined time period.

11. A computer readable storage device having computer readable instructions stored thereon, which, when executed by a processor of an information delivery device, configures the processor to perform the steps of:
receiving a command request from a client;
transmitting a command corresponding to the command request to a device;
obtaining device information transmitted from the device in response to the command;
storing the obtained device information;
judging whether the device information has been obtained in the obtaining step from the device within a predetermined period in response to the command transmitted in the transmitting step;
providing the device information obtained in the information obtaining step from the device to the client in response to the command request if the judging step judges that the device information has been obtained within the predetermined period;
providing stored past device information to the client in response to the command request if the judging step judges that the device information has not been obtained within the predetermined time period;
prohibiting a predetermined type of device information from being provided to the client as past device information;
deleting the past device information corresponding to the predetermined type of device information; and
judging that the past device information is the predetermined type of device information to be deleted if an elapsed time from acquisition of the past device information reaches a first predetermined time period and an elapsed time from last reception of the command request from the client reaches a second predetermined time period.

* * * * *